(12) United States Patent
Hiraga

(10) Patent No.: US 6,560,033 B2
(45) Date of Patent: May 6, 2003

(54) OBJECTIVE LENS FOR MICROSCOPE

(75) Inventor: Kouichi Hiraga, Kawasaki (JP)

(73) Assignee: Nikon Corporation, Tokyo (JP)

( * ) Notice: Subject to any disclaimer, the term of this patent is extended or adjusted under 35 U.S.C. 154(b) by 11 days.

(21) Appl. No.: 09/768,166

(22) Filed: Jan. 24, 2001

(65) Prior Publication Data

US 2002/0034018 A1 Mar. 21, 2002

(30) Foreign Application Priority Data

Jan. 28, 2000 (JP) ........................................ 2000-019586

(51) Int. Cl.$^7$ .............................................. G02B 21/02

(52) U.S. Cl. ........................................ 359/659; 359/658

(58) Field of Search .................................. 359/656–661

(56) References Cited

U.S. PATENT DOCUMENTS 5,469,299 A * 11/1995 Nagano ........................ 359/661
5,739,958 A * 4/1998 Abe ............................ 359/660

FOREIGN PATENT DOCUMENTS

JP A 09-090230 4/1997

* cited by examiner

*Primary Examiner*—Scott J. Sugarman
(74) *Attorney, Agent, or Firm*—Oliff & Berridge, PLC

(57) ABSTRACT

An objective lens for a microscope of the invention comprises, in order from an object side: a first lens group comprising a meniscus positive lens with a concave surface facing the object; a second lens group including a cemented lens and having a positive refractive power; a third lens group including a cemented lens and having a positive refractive power; a fourth lens group comprising a cemented lens; and a fifth lens group comprising a cemented lens.

11 Claims, 3 Drawing Sheets

OBJECTIVE LENS FOR MICROSCOPE

BACKGROUND OF THE INVENTION

1. Field of the Invention

The present invention relates to an achromatic objective lens for a microscope having a magnification of about 50 times and a working distance at least twice as large as the focal length.

2. Description of the Related Art

In general, in an objective lens for a microscope having a magnification of about 50 times, if an attempt is made to increase the working distance, spherical aberration and chromatic aberration are likely to deteriorate. Therefore, it has been very difficult to sufficiently increase both the working distance and numerical aperture.

As a long working-distance achromatic objective lens for a microscope having a magnification of about 50 times, there is known for example the one disclosed in Japanese Unexamined Patent Application, First Publication No. Hei 9-90230. However, the objective lens disclosed in Japanese Unexamined Patent Application, First Publication No. Hei 9-90230, has a numerical aperture of about 0.45, and a satisfactory numerical aperture and size of working distance cannot be obtained.

SUMMARY OF THE INVENTION

It is an object of the present invention to provide an achromatic objective lens for a microscope having a magnification of about 50 times and a long working distance, which can increase the numerical aperture up to about 0.55.

In order to achieve the above object, the objective lens for a microscope according to the present invention comprises, in order from an object side: a first lens group comprising a meniscus positive lens with a concave surface facing the object; a second lens group including a cemented lens and having a positive refractive power; a third lens group including a cemented lens and having a positive refractive power; a fourth lens group comprising a cemented lens; and a fifth lens group comprising a cemented lens.

According to the above aspects of the invention, an achromatic objective lens for a microscope having a long working distance, excellent imaging performance and a magnification of about 50 times can be obtained.

The objective lens for a microscope may satisfy the following conditional expression:

$$n1>1.8$$

$$v5N-v5P>30$$

wherein:

n1: refractive index of the meniscus positive lens constituting the first lens group;
v5N: Abbe's number of a negative lens in the fifth lens group;
v5P: Abbe's number of a positive lens in the fifth lens group.

The third lens group may be a cemented lens of a double-convex positive lens, a double-concave negative lens and a positive lens, in order from the object side.

The objective lens for a microscope may satisfy the following conditional expression:

$$1.2<|r1|/d0<2.2$$

wherein:
d0: distance on an optical axis from an object surface to a surface of the first lens group on the side closest to the object;
r1: radius of curvature of a surface of the first lens group on the side closest to the object.

The objective lens for a microscope according to a second aspect of the present invention comprises, in order from the object side: a first lens group comprising a meniscus positive lens with a concave surface facing the object; a second lens group including a cemented lens with the cementing surface having a concave surface facing the object, and having a positive refractive power; a third lens group including a cemented lens having a positive lens, a negative meniscus lens and a positive lens in order from the object side, and having a positive refractive power; a fourth lens group comprising a cemented lens; and a fifth lens group comprising a cemented lens.

The objective lens for a microscope of the second aspect may satisfy the following conditional expression:

$$v2P>65$$

$$v3P>65$$

wherein:
v2P: Abbe's number of a positive lens in the second lens group;
v3P: Abbe's number of a positive lens in the third lens group.

The objective lens for a microscope of the second aspect may satisfy the following conditional expression:

$$1.2<|r1|/d0<2.2$$

wherein:
d0: distance on an optical axis from an object surface to a surface of the first lens group on the side closest to the object;
r1: radius of curvature of a surface of the first lens group on the side closest to the object.

Moreover, the third lens group may be a cemented lens of a double-convex positive lens, a double-concave negative lens, and a positive lens, in order from the object side.

Furthermore, the objective lens for a microscope of the second aspect may satisfy the following conditional expression:

$$v5P<22.$$

The objective lens for a microscope according to a third aspect of the present invention comprises, in order from the object side: a first lens group having a meniscus positive lens with a concave surface facing the object; a second lens group including a cemented lens with a positive lens arranged on the object side, and having a positive refractive power; a third lens group including a triple cemented lens with a double-convex positive lens arranged on the object side, and having a positive refractive power; a fourth lens group comprising a cemented lens; and a fifth lens group comprising a cemented lens.

The objective lens for a microscope of the third aspect may satisfy the following conditional expression:

$$v2P>65$$

$$v3P > 65$$

wherein:
v2P: Abbe's number of a positive lens in the second lens group;
v3P: Abbe's number of a positive lens in the third lens group.

The objective lens for a microscope of the third aspect may satisfy the following conditional expression:

$$n1 > 1.8$$

$$v5N - v5P > 30$$

wherein:
n1: refractive index of the meniscus positive lens constituting the first lens group;
v5N: Abbe's number of a negative lens in the fifth lens group;
v5P: Abbe's number of a positive lens in the fifth lens group.

The objective lens for a microscope of the third aspect may satisfy the following conditional expression:

$$1.2 < |r1|/d0 < 2.2$$

wherein:
d0: distance on an optical axis from an object surface to a surface of the first lens group on the side closest to the object;
r1: radius of curvature of a surface of the first lens group on the side closest to the object.

The cemented lens in the third lens group may further have a double-concave negative lens and a positive lens.

The objective lens for a microscope of the first aspect may satisfy the following conditional expression:

$$v5P < 22.$$

DESCRIPTION OF THE PREFERRED EMBODIMENTS

Figure 1:
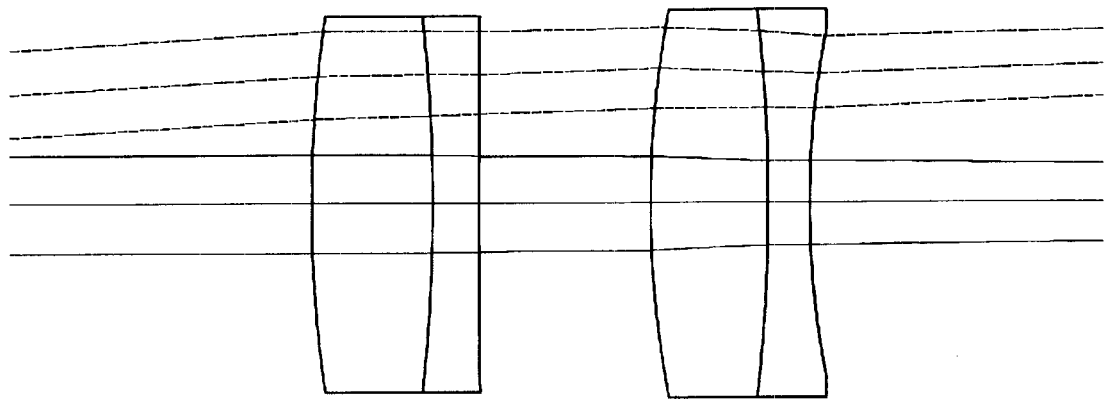
FIG. 1 is a configuration diagram showing one example of an imaging lens, used together with embodiments of the present invention.

In the objective lens of the present invention, the first lens group passes luminous flux generated from an object point so as to moderate the degree of divergence. At this time, it is necessary that the first lens group is constituted of a meniscus positive lens having a concave surface facing the object side so as to have a positive refractive power, and so as to minimize the generation of spherical aberration. Moreover, in order to make the occurrence of spherical aberration minimal, it is necessary not to increase the incidence angle of a light beam on the lens surface, even with respect to light beams having a high numerical aperture. In particular, it is necessary to increase the radius of curvature on the image side of the meniscus positive lens. To do this, it is desirable that the refractive index (n1) of the meniscus positive lens constituting the first lens group be as high as possible, and it is required that at least the following conditional expression (1) is satisfied:

$$n1 > 1.8 \quad (1)$$

If the value in the conditional expression (1) falls below the lower limit, spherical aberration excessively occurs in the first lens group, and sufficient correction becomes difficult in the subsequent lens groups. Moreover, in order to exert the above effect sufficiently, the lower limit of the conditional expression (1) is desirably 1.85.

Furthermore, it is desirable that the first lens group satisfy the following conditional expression (3):

$$1.2 < |r1|/d0 < 2.2 \quad (3)$$

wherein:
d0: distance on an optical axis from an object surface to a surface of the first lens group on the side closest to the object;
r1: radius of curvature of a surface of the first lens group on the side closest to the object.

In the case where only a correction of the spherical aberration is taken into consideration, it is desirable that luminous flux generated from the object point is incident perpendicular with respect to a surface of the first lens group on the side closest to the object. The condition at this time is:

$$|r1|/d0 = 1$$

With such a construction, however, in the case where coaxial epi-illumination is performed, the illumination light incident from the rear part of the objective lens is reflected on a surface of the first lens group on the side closest to the object and returned to the observed image plane as flared light. Hence the contrast of the image is greatly deteriorated. Accordingly, if the value in the conditional expression (3) falls below the lower limit, the flared light at the time of performing the coaxial epi-observation increases, to thereby greatly deteriorate the contrast of the observed image. On the other hand, if the value in the conditional expression (3) exceeds the upper limit, negative spherical aberration excessively occurs on the surface of the first lens group on the side closest to the object, and there is a possibility that it may not be sufficiently corrected in the second lens group and after.

The second lens group converts the luminous flux in which the degree of divergence is moderated by the first lens group into converging luminous flux, and corrects a part of the spherical aberration and axial chromatic aberration occurring in the first lens group. Therefore, it is necessary that the second lens group includes a positive lens and a cemented lens with at least one cementing surface having a negative refractive power. At this time, the cementing surface having a negative refractive power contributes to the correction of the negative spherical aberration occurring in the first lens group, and if the lens on the object side constituting the cemented lens is a negative lens, the cementing surface has a shape with the convex surface facing the object side. As a result, the angle at which the most circumferential light of the abaxial luminous flux is incident on the cementing surface increases, and the height of the light at the time of incidence onto the next surface having the positive refractive power becomes unnecessarily high. Therefore, the coma aberration on the lower side easily becomes positive, with the correction of the spherical aberration. Accordingly, the cemented lens included in the second lens group should have a positive lens on the object side, so that the cementing surface has a concave surface facing the object.

In order to perform favorable correction of axial chromatic aberration in the second lens group, it is desirable that the following conditional expression (5) be satisfied:

$$\nu 2P>65 \quad (5)$$

wherein:
ν2P: Abbe's number of a positive lens constituting the cemented lens in the second lens group.

If the value in the conditional expression (5) falls below the lower limit, the difference in the Abbe's number between the positive lens and the negative lens constituting the cemented lens decreases, thereby making it difficult to correct the axial chromatic aberration. In addition, even if it is possible to correct the axial chromatic aberration, since the refractive power of the positive lens and the negative lens becomes too large, the respective radii of curvature decrease, and hence higher order spherical aberration easily occurs.

The third lens group further corrects the remaining spherical aberration by means of the cementing surface having a negative refractive power, and the fourth and the fifth lens groups further correct the remaining chromatic aberration by means of the cemented lenses.

In the third lens group, in order to sufficiently perform correction of the axial chromatic aberration, including secondary dispersion, it is desirable to make the difference in a partial dispersion ratio small, between the glass constituting the positive lens and the glass constituting the negative lens. However, in general, if the glasses are selected so that the difference in the partial dispersion ratios thereof becomes small, the difference in the Abbe's number between the glass constituting the positive lens and the glass constituting the negative lens tends to become small. When the third lens group is constituted of a simple double cemented lens, if it is desired to sufficiently correct the chromatic aberration, the respective refractive powers of the positive lens and the negative lens become too large, and the respective radii of curvature become too small. As a result, there is a possibility that the lens shape becomes difficult to manufacture, or higher order spherical aberration easily occurs. Accordingly, to prevent this and to correct the spherical aberration and the coma aberration to a good balance, it is desirable to constitute the third lens group by a triple cemented lens comprising a double-convex positive lens, a double-concave negative lens, and a positive lens, in order from the object side.

In the third lens group, in order to perform more favorable correction of the axial chromatic aberration, it is desirable that either one of the positive lenses constituting the cemented lens in the third lens group satisfy the following conditional expression (6):

$$\nu 3P>65 \quad (6)$$

wherein:
ν3P: Abbe's number of either one of positive lenses constituting the cemented lens in the third lens group.

If the value in the conditional expression (6) falls below the lower limit, the difference in the Abbe's number between the positive lens and the negative lens constituting the cemented lens decreases, and even if the third lens group is constituted of a triple cemented lens, it becomes difficult to correct the axial chromatic aberration. In addition, even if it is possible to correct the axial chromatic aberration, since the refractive power of the positive lens and the negative lens becomes too large, the respective radii of curvature decrease, and hence higher order spherical aberration easily occurs.

The remaining axial chromatic aberration and chromatic aberration of magnification are corrected by means of the cemented lens in the fourth lens group and the cemented lens in the fifth lens group. In the fourth lens group, in order to perform more favorable correction of the axial chromatic aberration, it is desirable that the positive lens constituting the cemented lens in the fourth lens group satisfies the following conditional expression:

$$\nu 4P>65 \quad (7)$$

wherein:
ν4P: Abbe's number of either one of the positive lenses constituting the cemented lens in the third lens group.

If the value in the conditional expression (7) falls below the lower limit, the difference in the Abbe's number between the positive lens and the negative lens constituting the cemented lens decreases, thereby making it difficult to correct the axial chromatic aberration. In addition, even if it is possible to correct the axial chromatic aberration, since the refractive power of the positive lens and the negative lens becomes too large, the respective radii of curvature decrease, and hence higher order spherical aberration easily occurs.

However, if the cemented lens constituting the fifth lens group has a construction of a conventional achromatic lens, cementing a positive lens having a large Abbe's number and a negative lens having a small Abbe's number, it is possible to correct the axial chromatic aberration, but correction of the chromatic aberration of magnification becomes insufficient. Accordingly, in order to sufficiently correct both the axial chromatic aberration and the chromatic aberration of magnification, in the second to the fourth lens groups, the axial chromatic aberration is excessively corrected, and then, the cemented lens constituting the fifth lens group is made to have a reverse construction to that of the conventional achromatic lens, that is, cementing a positive lens having a small Abbe's number and a negative lens having a large Abbe's number. Thereby, the excessively corrected axial chromatic aberration is returned to a proper correction, and the chromatic aberration of magnification is also corrected. In order to sufficiently correct the chromatic aberration of magnification, in particular in the case of a long working-distance objective lens as in the present invention, it is necessary for the first lens group to satisfy the above described conditional expression (1) and at the same time for the fifth lens group to satisfy the following conditional expression (2):

$$\nu 5N-\nu 5P>30 \quad (2)$$

wherein:
ν5N: Abbe's number of a negative lens in the fifth lens group;
ν5P: Abbe's number of a positive lens in the fifth lens group.

If the value in the conditional expression (2) falls below the lower limit, the correction effect of the chromatic aberration of magnification is insufficient, making it impossible to perform sufficient correction of the chromatic aberration of magnification.

In order to correct the axial chromatic aberration and also correct the chromatic aberration of magnification sufficiently, it is desirable that the fifth lens group satisfy the following conditional expression (4):

$$\nu 5P<25 \quad (4)$$

wherein:
ν5P: Abbe's number of either one of the positive lenses constituting the cemented lens in the third lens group.

If the value in the conditional expression (4) exceeds the upper limit, it becomes difficult to sufficiently correct the chromatic aberration of magnification.

Embodiments of the present invention will now be described hereunder.

The objective lens for a microscope in each embodiment is of an infinity-system correction type, and is used together with an imaging lens having parameters as shown in Table 1. In all tables including Table 1, f denotes focal length of the objective lens, N.A. denotes numerical aperture, and β denotes magnification. Moreover, R denotes radius of curvature of the lens, D denotes a gap between lens surfaces, and nd and vd denote refractive index and Abbe's number respectively, with respect to the d line (587.6 nm).

TABLE 1

| | R | D | nd | (f = 200 mm) vd |
|---|---|---|---|---|
| 1 | 75.04300 | 5.10 | 1.62280 | 57.03 |
| 2 | −75.04300 | 2.00 | 1.74950 | 35.19 |
| 3 | 1600.58000 | 7.50 | | |
| 4 | 50.25600 | 5.10 | 1.66755 | 41.96 |
| 5 | −84.54100 | 1.80 | 1.61266 | 44.40 |
| 6 | 36.911 | 168.44 | | |

Moreover, FIG. 1 shows a configuration diagram of the imaging lens.

Figure 2:
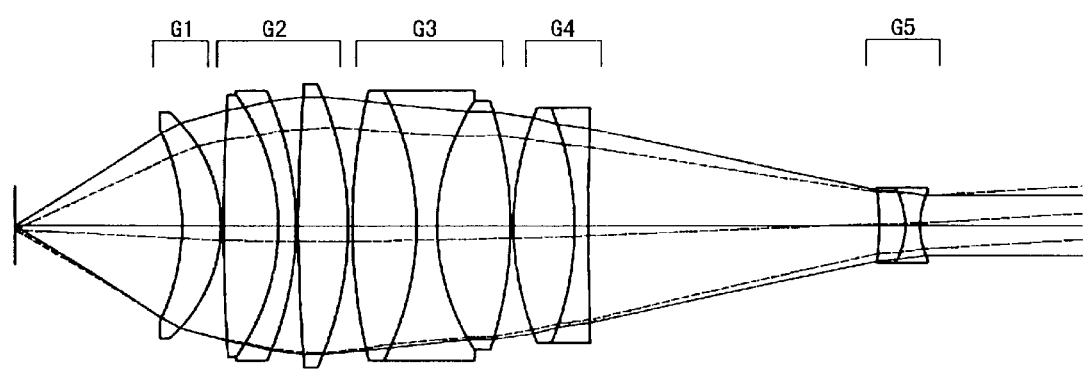
FIG. 2 is a configuration diagram of a first embodiment of the present invention.

FIG. 2 is a configuration diagram of a first embodiment of the present invention.

The first embodiment comprises, in order from the object side: a first lens group G1 comprising a positive meniscus lens with the concave surface facing the object; a second lens group G2 including a cemented lens in which a positive lens is arranged on the side closest to the object, and a positive single lens, and having a positive refractive power; a third lens group G3 comprising a cemented lens of a double-convex positive lens and a negative lens, and having a positive refractive power; a fourth lens group G4 comprising a cemented lens of a positive lens and a negative lens; and a fifth lens group G5 comprising a cemented lens of a positive lens and a negative lens.

Table 2 shows parameters in the first embodiment.

TABLE 2

| | R | D | nd | (f = 4 mm, N.A. = 0.55, β = −50) vd |
|---|---|---|---|---|
| | | 11.70 | | |
| 1 | −17.000 | 2.80 | 1.9027 | 35.72 |
| 2 | −11.035 | 0.20 | | |
| 3 | 200.184 | 3.80 | 1.4856 | 85.20 |
| 4 | −16.770 | 1.20 | 1.7950 | 28.57 |
| 5 | −24.560 | 0.20 | | |
| 6 | 139.705 | 3.50 | 1.4856 | 85.20 |
| 7 | −25.286 | 0.30 | | |
| 8 | 41.174 | 4.50 | 1.4343 | 95.00 |
| 9 | −21.845 | 1.50 | 1.6127 | 44.41 |
| 10 | 16.828 | 5.20 | 1.4343 | 95.00 |
| 11 | −28.039 | 0.20 | | |
| 12 | 22.897 | 4.30 | 1.4856 | 85.20 |
| 13 | −22.897 | 1.00 | 1.7400 | 31.70 |
| 14 | 206.005 | 20.60 | | |
| 15 | −25.807 | 1.80 | 1.8467 | 23.78 |
| 16 | −6.103 | 1.10 | 1.6516 | 58.55 |
| 17 | 6.804 | | | |

In this first embodiment, values corresponding to the above described conditional expression are as follows:
(1) n1=1.9027
(2) ν5N−ν5P=34.77
(3) r1=17.000
(4) ν2P=85.20, 85.20
(5) ν3P=95.00, 95.00
(6) ν4P=85.20

Figure 3:
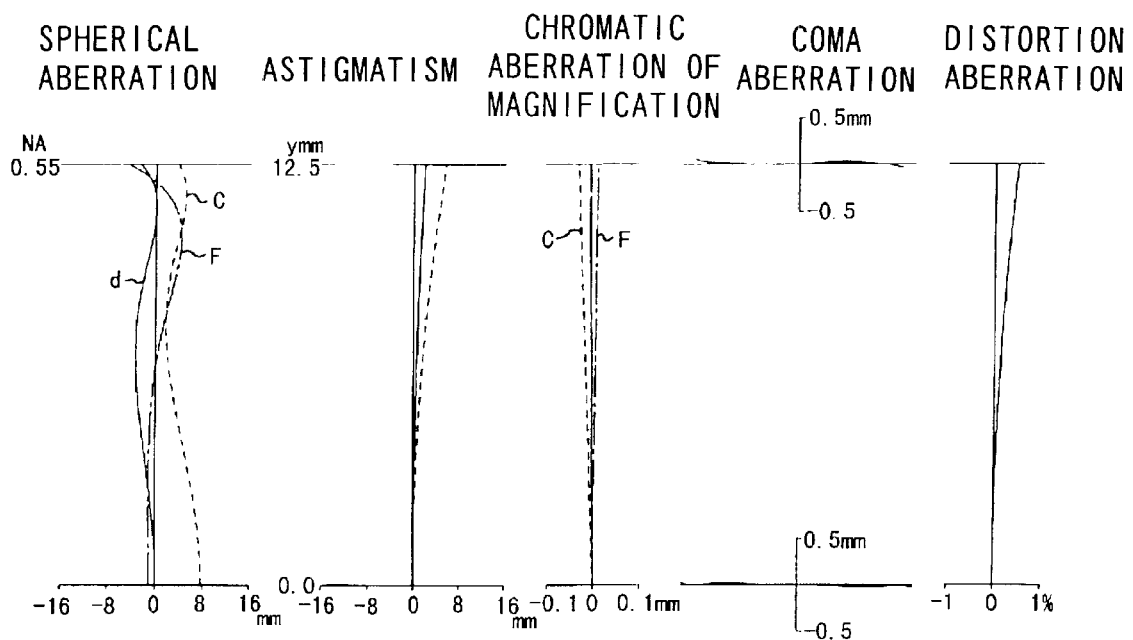
FIG. 3 is an aberration diagram of the first embodiment.

FIG. 3 is an aberration diagram for when the objective lens in the first embodiment is combined with the above described imaging lens. At this time, the gap between the objective lens in the first embodiment and the imaging lens is designated as 150 mm. In each aberration diagram in FIG. 3, d denotes an aberration in the d line (587.6 nm), C denotes an aberration in the C line (656.3 nm), F denotes an aberration in the F line (486.1 nm), and g denotes an aberration in the g line (435.8 nm). The astigmatism diagram shows an astigmatism in the d line (587.6 nm), with the solid line representing a sagittal image surface, and the broken line representing a meridional image surface. Moreover, the coma aberration diagram and distortion aberration diagram respectively represent the coma aberration and distortion aberration in the d line, which is a reference wavelength.

From FIG. 3, it is seen that, in the first embodiment, each aberration is sufficiently corrected, while securing a numerical aperture as large as 0.55 and having a working distance of 10 mm or larger.

Figure 4:
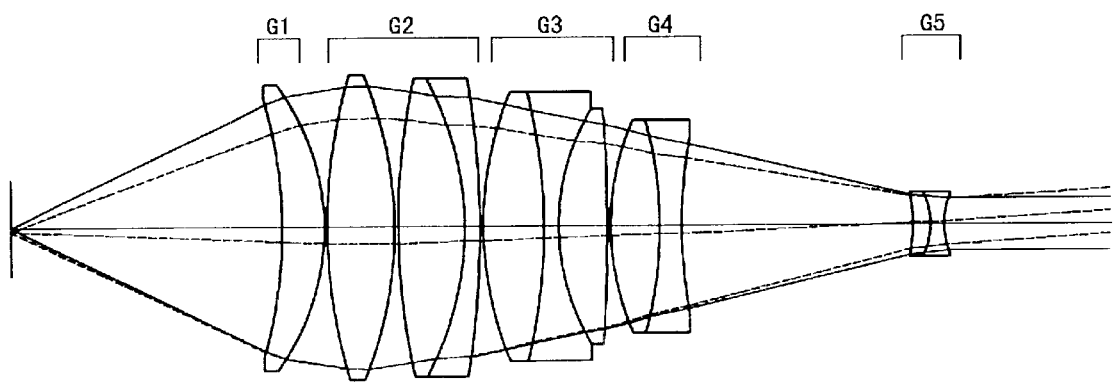
FIG. 4 is a configuration diagram of a second embodiment of the present invention.

FIG. 4 is a configuration diagram of a second embodiment of the present invention. The second embodiment comprises, in order from the object side: a first lens group G1 comprising a positive meniscus lens with the concave surface facing the object; a second lens group G2 including a positive single lens and a cemented lens with a positive lens arranged on the side closest to the object, and having a positive refractive power; a third lens group G3 comprising a cemented lens having a double-convex positive lens, a double-concave negative lens and a positive lens and having a positive refractive power; a fourth lens group G4 comprising a cemented lens of a positive lens and a negative lens; and a fifth lens group G5 comprising a cemented lens of a positive lens and a negative lens. Table 3 shows parameters in the second embodiment.

TABLE 3

| | R | D | nd | (f = 4 mm, N.A. = 0.45, β = −50) vd |
|---|---|---|---|---|
| | | 18.39 | | |
| 1 | −34.969 | 3.00 | 1.8830 | 40.76 |
| 2 | −16.828 | 0.20 | | |
| 3 | 39.311 | 4.60 | 1.4856 | 85.20 |
| 4 | −28.609 | 0.20 | | |
| 5 | 47.914 | 4.70 | 1.4343 | 95.00 |
| 6 | −21.850 | 1.10 | 1.7400 | 31.70 |
| 7 | −61.688 | 0.20 | | |
| 8 | 24.693 | 4.20 | 1.4343 | 95.00 |
| 9 | −41.63 | 1.00 | 1.6127 | 44.41 |
| 10 | 15.985 | 3.40 | 1.4343 | 95.00 |
| 11 | −157.166 | 0.20 | | |
| 12 | 17.790 | 3.40 | 1.4856 | 85.20 |
| 13 | −29.228 | 1.50 | 1.7400 | 31.70 |
| 14 | 33.014 | 15.75 | | |
| 15 | −11.998 | 1.20 | 1.9229 | 18.90 |
| 16 | −5.081 | 1.00 | 1.6510 | 56.16 |
| 17 | 6.200 | | | |

In the second embodiment, values corresponding to the above described conditional expression are as follows:
(1) n1=1.8830
(2) ν5N−ν5P=37.26
(3) 1 r1=−34.969
(4) ν2P=85.20, 95.00
(5) ν3P=95.00, 95.00
(6) ν4P=85.20
(7) ν5P=18.90

Figure 5:
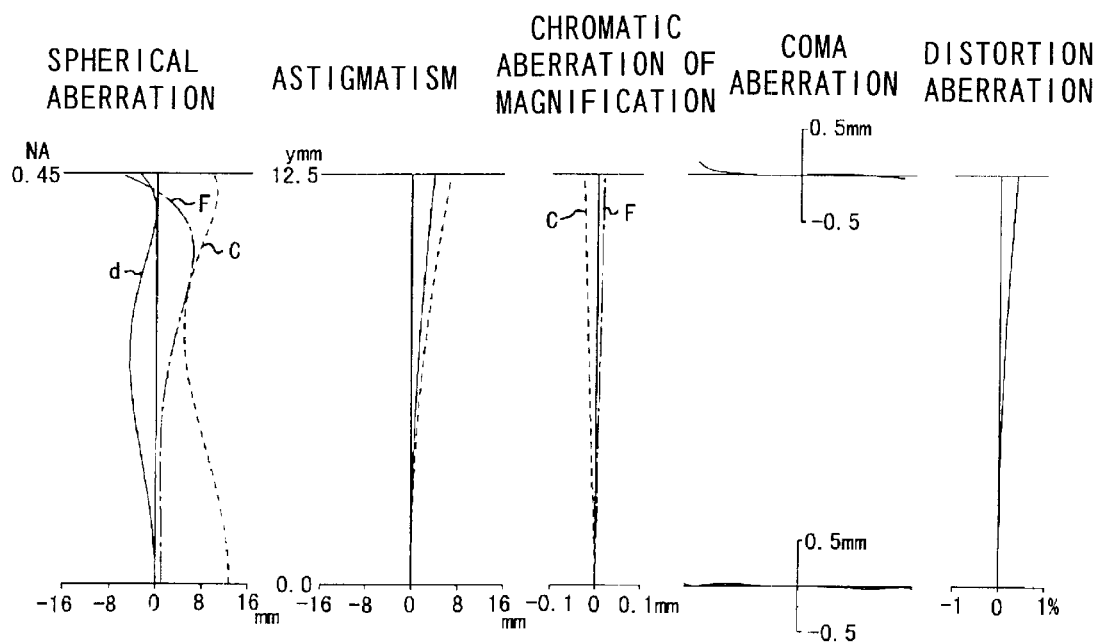
FIG. 5 is an aberration diagram of the second embodiment.

FIG. 5 is an aberration diagram for when the objective lens in the second embodiment is combined with the above described imaging lens. At this time, the gap between the objective lens in the second embodiment and the imaging lens is designated as 150 mm. Symbols in each aberration diagram in FIG. 5 are all similar to those in FIG. 3.

From FIG. 5, it is seen that, in the second embodiment, each aberration is sufficiently corrected, while having a numerical aperture of 0.45 and a working distance of 17 mm or larger.

What is claimed is:

1. An objective lens for a microscope comprising, in order from the object side:

a first lens group comprising a meniscus positive lens with a concave surface facing the object;

a second lens group including a cemented lens with the cementing surface having a concave surface facing the object, and having a positive refractive power;

a third lens group including a cemented lens having a positive lens, a negative biconcave lens and a positive lens in order from the object side, and having a positive refractive power;

a fourth lens group comprising a cemented lens; and a fifth lens group comprising a cemented lens.

2. An objective lens for a microscope according to claim 1 satisfying the following conditional expression:

$\nu 2P > 65$ $\nu 3P > 65$ wherein:

ν2P: Abbe's number of a positive lens in the second lens group;

ν3P: Abbe's number of a positive lens in the third lens group.

3. An objective lens for a microscope according to claim 1 satisfying the following conditional expression:

$1.2 < |r1|/d0 < 2.2$ wherein:

d0: distance on an optical axis from an object surface to a surface of the first lens group on the side closest to the object;

r1: radius of curvature of a surface of the first lens group on the side closest to the object.

4. An objective lens for a microscope according to claim 1, wherein said third lens group is a cemented lens having a double-convex positive lens, a double-concave negative lens and a positive lens, in order from the object side.

5. An objective lens for a microscope according to claim 1 satisfying the following conditional expression:

$\nu 5P < 22$ wherein:

ν5P: Abbe's number of a positive lens in the fifth lens group.

6. An objective lens for a microscope comprising, in order from the object side:

a first lens group having a meniscus positive lens with a concave surface facing the object;

a second lens group including a cemented lens with a positive lens arranged on the object side, and having a positive refractive power;

a third lens group including a triple cemented lens with a double-convex positive lens arranged on the object side, and having a positive refractive power;

a fourth lens group comprising a cemented lens; and a fifth lens group comprising a cemented lens.

7. An objective lens for a microscope according to claim 6 satisfying the following conditional expression:

$\nu 2P > 65$ $\nu 3P > 65$ wherein:

ν2P: Abbe's number of a positive lens in the second lens group;

ν3P: Abbe's number of a positive lens in the third lens group.

8. An objective lens for a microscope according to claim 6 satisfying the following conditional expression:

$n1 > 1.8$ $\nu 5N - \nu 5P > 30$ wherein:

n1: refractive index of the meniscus positive lens constituting the first lens group;

ν5N: Abbe's number of a negative lens in the fifth lens group;

ν5P: Abbe's number of a positive lens in the fifth lens group.

9. An objective lens for a microscope according to claim 6 satisfying the following conditional expression:

$1.2 < |r1|/d0 < 2.2$ wherein:

d0: distance on an optical axis from an object surface to a surface of the first lens group on the side closest to the object;

r1: radius of curvature of a surface of the first lens group on the side closest to the object.

10. An objective lens for a microscope according to claim 6, wherein the cemented lens in said third lens group further has a double-concave negative lens and a positive lens.

11. An objective lens for a microscope according to claim 6 satisfying the following conditional expression:

$\nu 5P < 22$ wherein:

ν5P: Abbe's number of a positive lens in the fifth lens group.

* * * * *